Dec. 4, 1956 R. WITTE 2,773,177

CONVERTER MECHANISM FOR TV RECEIVER

Filed Dec. 26, 1952 2 Sheets-Sheet 1

INVENTOR.
Roy Witte
BY
Norman L. Mueller
Atty.

CONVERTER MECHANISM FOR TV RECEIVER

Filed Dec. 26, 1952 2 Sheets-Sheet 2

INVENTOR.
Roy Witte
BY Foorman L. Mueller
Atty.

United States Patent Office 2,773,177
Patented Dec. 4, 1956

2,773,177

CONVERTER MECHANISM FOR TV RECEIVER

Roy Witte, Wheaton, Ill., assignor to Motorola, Inc., Chicago, Ill., a corporation of Illinois Application December 26, 1952, Serial No. 328,048

3 Claims. (Cl. 250—16)

Figure 1:
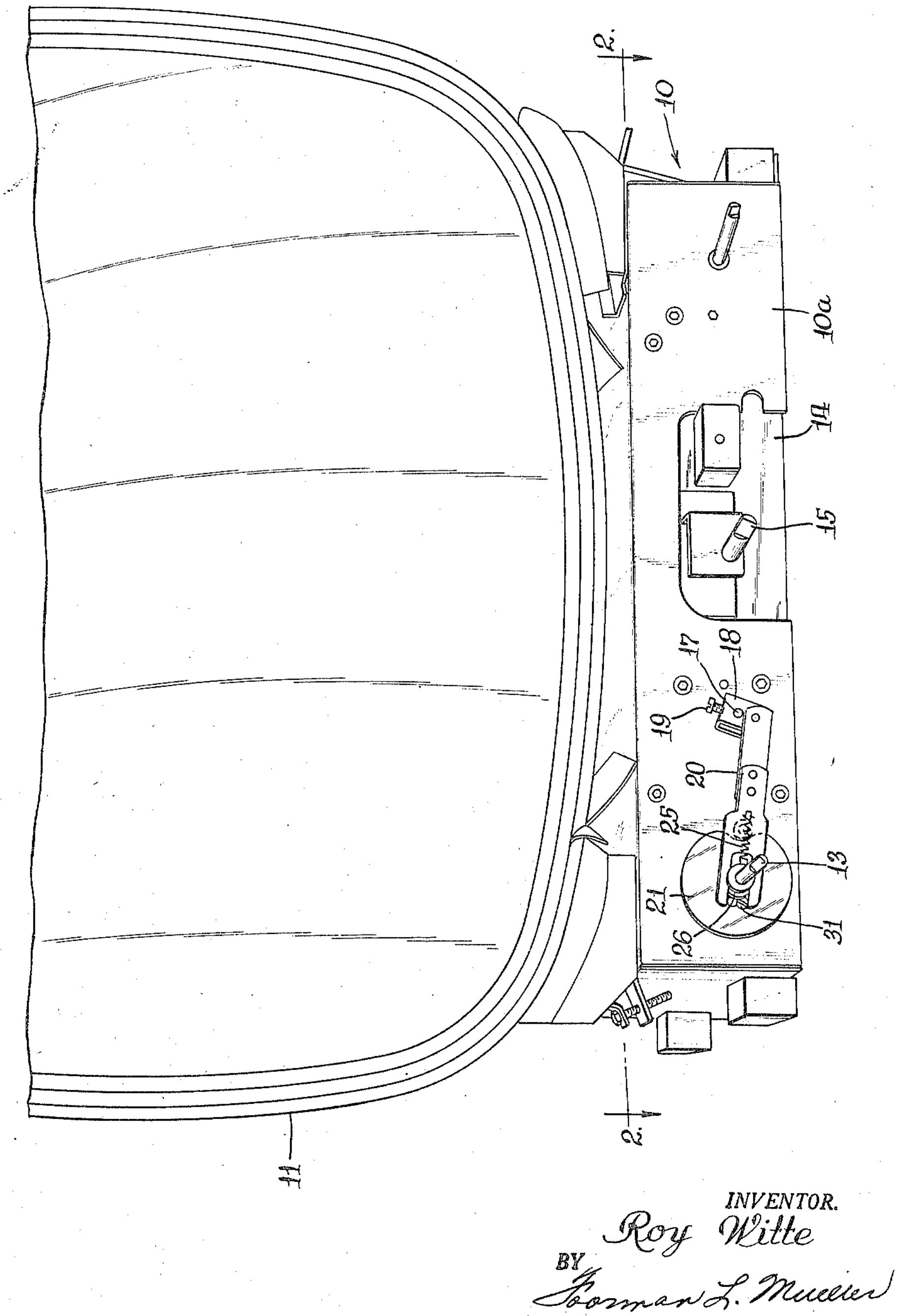

This invention relates generally to a converting mechanism for enabling a television receiver to utilize television signals in a high frequency band outside the normal operating range of the receiver, and more particularly to a mechanism of the above type that is constructed to be linked to the tuning device of the television receiver in such a manner that the receiver may be conditioned for normal or high frequency reception without the need for extra switching or other manual operations.

Present day television receivers are constructed to utilize and reproduce television signals lying within what is generally termed the "very high frequency band" extending to 216 megacycles. Due to the tremendous advance in the television industry and the requirement for more and more television stations, this band is no longer capable of satisfying present and future television needs. For this reason, a second frequency band extending from 470 megacycles to 890 megacycles has been provided for television, the latter being designated as the "ultra high frequency" band.

The allocation of the ultra high frequency band has created a problem, insofar as television receivers presently on the market are concerned, in that such receivers in their present state are incapable of utilizing signals in the ultra high frequency band and require a converter for that purpose. Many types of ultra high frequency converters have been proposed, and these converters are usually some form of a heterodyne circuit. The converter is connected between the antenna and the television receiver and it heterodynes the signals in the ultra high frequency band to an intermediate frequency within the operating range of the receiver. In order to be suitable for use by the consuming public, such converters must be constructed to be operable without undue complications.

It is, accordingly, an object of the present invention to provide an ultra high frequency converter mechanism that is constructed to be placed in and out of operation simply and expeditiously.

A further object of the invention is to provide an improved converter mechanism by means of which a television receiver may be operated outside its normal frequency range or within its frequency range without the need for separate switchover or other manual operations.

A feature of the invention is the provision of a converter unit in a television receiver that is constructed to be energized and placed in an operable condition whenever the tuning device of the receiver is turned to a selected setting.

Another feature of the invention is the provision in a television receiver, having a standard tuner for tuning the receiver to selected signal channels in the V. H. F. band, of a converter device for enabling the receiver to be tuned to television signals in the U. H. F. band and a coupler between the tuner and the converter which places the latter in an operating condition whenever the tuner is set to a selected unused channel in the V. H. F. band.

Figures 2, 3:
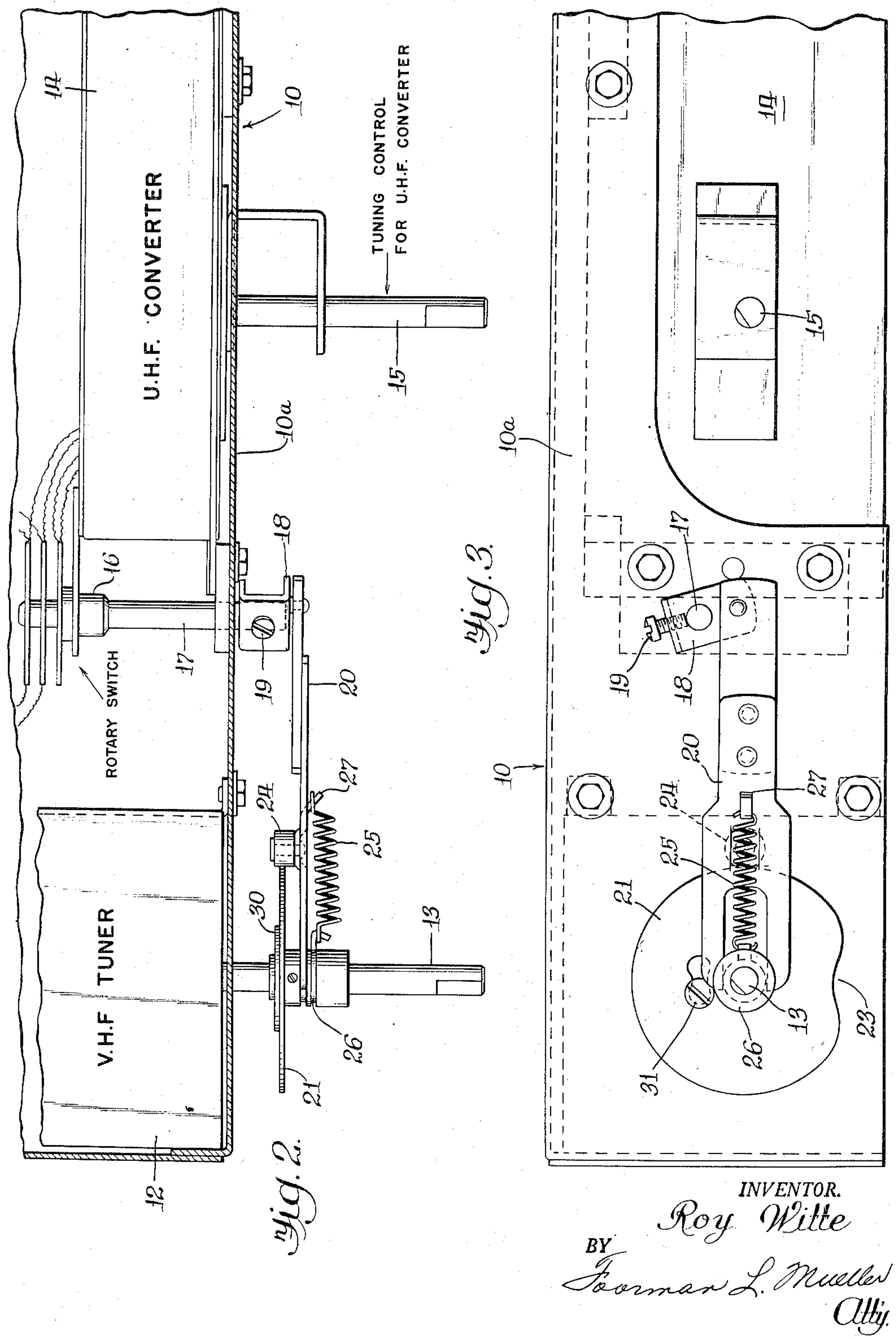

The above and other features of the invention which are believed to be new are set forth with particularity in the appended claims. The invention itself, however, together with further objects and advantages thereof, may best be understood by reference to the following description when taken in conjunction with the accompanying drawings in which:

Fig. 1 is a front view of a portion of the chassis of a television receiver in which the converter mechanism of the invention is incorporated, Fig. 2 is a view of the chassis taken along the lines 2—2 of Fig. 1, and Fig. 3 is another front view of a portion of the chassis with the converter mechanism in its inoperative condition.

As previously stated the present invention provides a converter mechanism for enabling a television receiver to receive and utilize television signals in both the very high frequency (V. H. F.) band and the ultra high frequency (U. H. F.) band. The receiver includes a tuning device for selective tuning to different television signal channels in the V. H. F. band, and the converter mechanism includes a converting device for enabling the receiver to utilize television signals in the U. H. F. band and for selectively tuning the receiver to the latter signals. A switching mechanism is coupled to the converting device and has first and second operating positions for selectively rendering the device inoperative and operative. Finally, coupling apparatus is provided that mechanically couples the tuning device of the receiver to the switching mechanism for actuating the switching mechanism to its second position for a selected operating position of the tuning device and for actuating the switching mechanism to its first position for all other operating positions of the tuning device.

Referring now to the drawings, the television chassis therein illustrated includes a base 10 which supports a cathode ray reproducer 11 and the various other electrical components of the television receiver. Base 10 has a front panel 10*a* through which the actuating shafts for the control elements of the receiver extend.

The receiver includes a tuning device 12 of any well-known construction having a tuning shaft 13 extending through front panel 10*a*. The tuning shaft may be rotated to tune the receiver selectively to the different television signal channels in the V. H. F. band. An ultra high frequency converter 14 is mounted adjacent tuner 12 with its tuning control 15 also extending through the front panel. A rotary switch 16 is supported on panel 10*a* and its actuating shaft 17 extends through the panel intermediate shafts 13 and 15.

Rotary switch 16 has two operating positions controlled by shaft 17. In one position the switch connects the antenna utilized in the system to the antenna terminals of the television receiver and deenergizes the converter 14; this conditions the receiver for normal operation in the very high frequency band. In its other position, the switch interposes the converter between the antenna and the antenna terminals and energizes the converter; this conditions the receiver for operation in the ultra high frequency band. In the event that two antennas are used, one for V. H. F. and the other for U. H. F. reception, the switch also switches from one antenna to the other as it is changed from one operating position to the other.

Shaft 17 has a radial bracket 18 mounted thereon and held rigidly against rotation by a screw 19. Bracket 18 has one end of an arm 20 pivoted thereto, the arm having a bifurcated portion at its other end embracing shaft 13 of tuner 12. A disc-like cam 21 is mounted on shaft 13, the cam having a notched or grooved peripheral portion 23 corresponding to a selected angular position of shaft 13. A cam follower 24 is rotatably mounted on arm 20 and engages the peripheral surface of cam 21. A resilient tension spring 25 is secured at one end to a hooked disc 26 rotatably supported on shaft 13 and at the other end to a projection 27 on arm 20. The resilient spring biases arm 20 to the left of the drawing with cam follower 24 engaging the peripheral surface of cam 21.

A suitably calibrated dial (not shown) is usually mounted on shaft 13, and the receiver may be tuned to various television signal channels in the very high frequency band by turning the shaft to predetermined settings. For these settings, cam 21 causes arm 20 to be held to the right of the drawing against the tension of spring 25, and this causes switch 16 to be held in its "off" position.

When U. H. F. reception is desired, shaft 13 is merely tuned to a selected channel in the V. H. F. band which, in some receivers is provided especially for U. H. F. operation, and in other receivers is merely an unused channel. Cam 21 is orientated on shaft 13 so that when the shaft is turned to the latter position, cam follower 24 drops into groove 23 causing arm 20 to turn switch 16 "on." U. H. F. signals may now be received by tuning the converter 14 to the various signal channels in the U. H. F. band, the converter heterodyning each such signal to a selected intermediate frequency corresponding to the selected unused V. H. F. signal channel referred to above.

In some areas, the V. H. F. channel designated channel 6 by present standards, is unused and suitable for U. H. F. reception as described above; in other areas, channel 5 is unused and suitable for U. H. F. reception. To provide convenient orientation of cam 21 so that groove 23 corresponds to channel 5 or channel 6, cam 21 may be rotatably mounted on shaft 13 and secured by screw 31 to an indexing disc 30 which is fixed to the shaft. Screw 31 extends through a slot in cam 21 which is arranged so that when the screw is loosened and the cam turned to position the screw at one end of the slot, notch 23 corresponds to channel 5; and when the cam is turned to position the screw at the other end of the slot, notch 23 corresponds to channel 6. In this manner, adjustment of the mechanism can quickly be made to utilize one of the two channels available in any particular location.

The invention provides, therefore, an extremely simple and efficient converter mechanism whereby a television receiver may be conditioned for U. H. F. reception merely by tuning its standard V. H. F. tuner to a selected unused channel in the V. H. F. signal band; and whereby such receiver may be returned to the V. H. F. band merely by tuning the standard V. H. F. tuner back to a selected signal channel in the latter band.

While a particular embodiment of the invention has been shown and described, modifications may be made, and it is intended in the appended claims to cover all such modifications as fall within the true spirit and scope of the invention.

I claim:

1. In a television receiver for receiving television signals in two distinct frequency ranges and which includes a front panel, a tuning device for selectively tuning the receiver to different television signal channels in a first frequency range, and a tuning shaft for actuating said tuning device extending through the front panel, the combination of a disc-like cam secured to the tuning shaft having a notched peripheral portion corresponding to a selected angular position of said shaft, a converting device for enabling the receiver to utilize television signals in a second frequency range and for selectively tuning the receiver to such signals, a rotary switch having a first operating position in which said converting device is rendered inoperative and having a second operating position in which said converting device is rendered operative, an actuating shaft for said switch extending through the aforesaid front panel parallel to but spaced from said tuning shaft, a radial bracket secured to said actuating shaft, an arm having one end pivoted to said bracket and having a bifurcated portion at its other end embracing the tuning shaft, resilient means secured to said arm and to the tuning shaft for biasing said arm towards the tuning shaft, and a cam follower rotatably mounted on said arm and engaging the periphery of the aforesaid cam, whereby said switch is actuated to its second operating position when the tuning shaft is in the aforesaid selected angular position.

2. In a television receiver for receiving television signals in two distinct frequency ranges, the combination of tuning device for selectively tuning the receiver to different television signal channels in a first frequency range, a tuning shaft for actuating said tuning device, a cam secured to the tuning shaft in coaxial relation therewith and having a peripheral portion of varying diameter corresponding to a selected angular position of said shaft, a converting device for enabling the receiver to utilize television signals in a second frequency range and for selectively tuning the receiver to such signals, a rotary switch having a first operating position and a second operating position for controlling the energization of said converting device, an actuating shaft for said switch extending essentially parallel to said tuning shaft and spaced therefrom, a radial bracket secured to said actuating shaft, an arm extending essentially perpendicular to said tuning shaft and to said actuating shaft and having one end pivoted to said radial bracket, the other end of said arm having a bifurcated portion embracing said tuning shaft, resilient means for biasing said arm along its longitudinal axis toward the tuning shaft, and a cam follower rotatably mounted on said arm and engaging the periphery of said cam to cause said switch to be actuated from its first to its second operating position when said shaft is in said selected angular position.

3. The combination defined in claim 2 in which the angular position of said cam with respect to said tuning shaft is adjustable to change the selected angular position of said tuning shaft at which said switch is actuated.

References Cited in the file of this patent

UNITED STATES PATENTS

| | | |
|---|---|---|
| 2,272,929 | Barth | Feb. 10, 1942 |
| 2,379,284 | Dimmer | June 26, 1945 |
| 2,469,941 | Abrams | May 10, 1949 |
| 2,543,042 | Miller | Feb. 27, 1951 |
| 2,580,895 | De Tar | Jan. 1, 1952 |
| 2,598,857 | Sziklai | June 3, 1952 |
| 2,624,835 | Lear | Jan. 6, 1953 |